(12) United States Patent
Kaushik et al.

(10) Patent No.: US 10,949,116 B2
(45) Date of Patent: Mar. 16, 2021

(54) STORAGE RESOURCE CAPACITY PREDICTION UTILIZING A PLURALITY OF TIME SERIES FORECASTING MODELS

(71) Applicant: EMC IP Holding Company LLC, Hopkinton, MA (US)

(72) Inventors: Vibhor Kaushik, Shrewsbury, MA (US); Zachary W. Arnold, Concord, MA (US); Siva Kottapalli, North Chelmsford, MA (US); Peter Beale, Acton, MA (US); Karthik Hubli, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 5 days.

(21) Appl. No.: 16/526,006

(22) Filed: Jul. 30, 2019

(65) Prior Publication Data

US 2021/0034278 A1     Feb. 4, 2021

(51) Int. Cl.
*G06F 3/06*         (2006.01)
*G06F 11/34*       (2006.01)
*G06F 11/30*       (2006.01)

(52) U.S. Cl.
CPC .......... *G06F 3/0653* (2013.01); *G06F 3/0614* (2013.01); *G06F 3/0629* (2013.01);
(Continued)

(58) Field of Classification Search
CPC . G06F 3/06; G06F 11/30; G06F 11/34; G06F 3/0653; G06F 3/0641;
(Continued)

(56) References Cited

U.S. PATENT DOCUMENTS 7,987,106 B1   7/2011   Aykin
8,499,066 B1 *   7/2013   Zhang .................. H04L 47/823
                                                                              709/223
(Continued)

FOREIGN PATENT DOCUMENTS

WO    2012020329 A1    2/2012
WO    2014075108 A2    5/2014
WO    2017132032 A1    8/2017

OTHER PUBLICATIONS

U.S. Appl. No. 16/260,713, filed Jan. 29, 2019 in the name of Arnold et al. and entitled "System and Method for Capacity Prediction."

*Primary Examiner* — Christopher B Shin
(74) *Attorney, Agent, or Firm* — Ryan, Mason & Lewis, LLP

(57) ABSTRACT

A method includes obtaining historical storage resource utilization data for a given set of storage resources of one or more storage systems, and generating a plurality of model-specific storage resource capacity predictions utilizing the historical storage resource utilization data and respective ones of a plurality of time series capacity prediction forecasting models. The method also includes selecting a subset of the model-specific storage resource capacity predictions having one or more designated characteristics, determining an overall storage resource capacity prediction based at least in part on a combination of the selected subset of the model-specific storage resource capacity predictions, and modifying a provisioning of storage resources of the one or more storage systems based at least in part on the overall storage resource capacity prediction.

20 Claims, 7 Drawing Sheets

(52) U.S. Cl.
CPC ........ *G06F 3/0683* (2013.01); *G06F 11/3034* (2013.01); *G06F 11/3051* (2013.01); *G06F 11/3409* (2013.01); *G06F 11/3452* (2013.01)

(58) Field of Classification Search
CPC .. G06F 3/0629; G06F 3/0683; G06F 11/3034; G06F 11/3051; G06F 11/3409; G06F 11/3452
USPC ......................................................... 711/117
See application file for complete search history.

(56) References Cited

U.S. PATENT DOCUMENTS

| | | | |
|---|---|---|---|
| 10,120,790 B1 * | 11/2018 | Varteresian | H04L 67/34 |
| 10,146,449 B1 * | 12/2018 | Labonte | G06F 3/0683 |
| 2007/0198328 A1 | 8/2007 | Fuller et al. | |
| 2008/0027948 A1 * | 1/2008 | Corley | G06F 11/3495 |
| 2011/0197027 A1 * | 8/2011 | Balasubramanian | G06F 3/0685 |
| | | | 711/117 |
| 2011/0302301 A1 | 12/2011 | Lowes et al. | |
| 2016/0063385 A1 | 3/2016 | Singh et al. | |
| 2016/0098291 A1 | 4/2016 | Kondaveeti et al. | |
| 2018/0121095 A1 * | 5/2018 | Atia | G06F 3/0604 |
| 2019/0109870 A1 * | 4/2019 | Bedhapudi | H04L 63/0428 |
| 2020/0112607 A1 * | 4/2020 | Shoshan | H04L 67/34 |
| 2020/0218571 A1 * | 7/2020 | Chen | G06F 9/505 |

\* cited by examiner

STORAGE RESOURCE CAPACITY PREDICTION UTILIZING A PLURALITY OF TIME SERIES FORECASTING MODELS

FIELD

The field relates generally to information processing systems, and more particularly to storage in information processing systems.

BACKGROUND

Information processing systems may provision storage resources of various storage systems for use by different users. The different users, for example, may have associated storage pools each comprising storage resources provisioned from one or more storage systems. To ensure that available storage resources in the storage pools do not run out, it may be desired to provide storage capacity predictions to the users. Due to varying storage usage patterns of the different users, however, it is difficult to accurately predict storage capacity needs over time.

SUMMARY

Illustrative embodiments provide techniques for storage resource capacity prediction. Embodiments advantageously enable efficient allocation and provisioning of storage resources.

In one embodiment, a method comprises obtaining historical storage resource utilization data for a given set of storage resources of one or more storage systems, generating a plurality of model-specific storage resource capacity predictions utilizing the historical storage resource utilization data and respective ones of a plurality of time series capacity prediction forecasting models, selecting a subset of the model-specific storage resource capacity predictions having one or more designated characteristics, determining an overall storage resource capacity prediction based at least in part on a combination of the selected subset of the model-specific storage resource capacity predictions, and modifying a provisioning of storage resources of the one or more storage systems based at least in part on the overall storage resource capacity prediction. The method is performed by at least one processing device comprising a processor coupled to a memory.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

In some information processing systems, storage resources of one or more storage systems are provisioned for use by multiple different users. For example, a given user may be allocated a particular portion of the storage resources of one or more storage systems for use within some designated time period, as a set of storage resources provisioned for the given user. By predicting the storage resource capacity that will be utilized by the given user over the designated time period, a system can provide intelligent recommendations for adding storage resources to or removing storage resources from the set of provisioned storage resources over the designated time period. Such storage resource capacity prediction enables more efficient utilization of the storage resources (e.g., by avoiding waste associated with under-utilization of provisioned storage resources). Storage resource capacity prediction can also be used to avoid certain undesired scenarios, such as the given user "running out" of storage resources before expiration of the designated time period, which could result in the given user being unable to store new or updated data.

Figure 1:
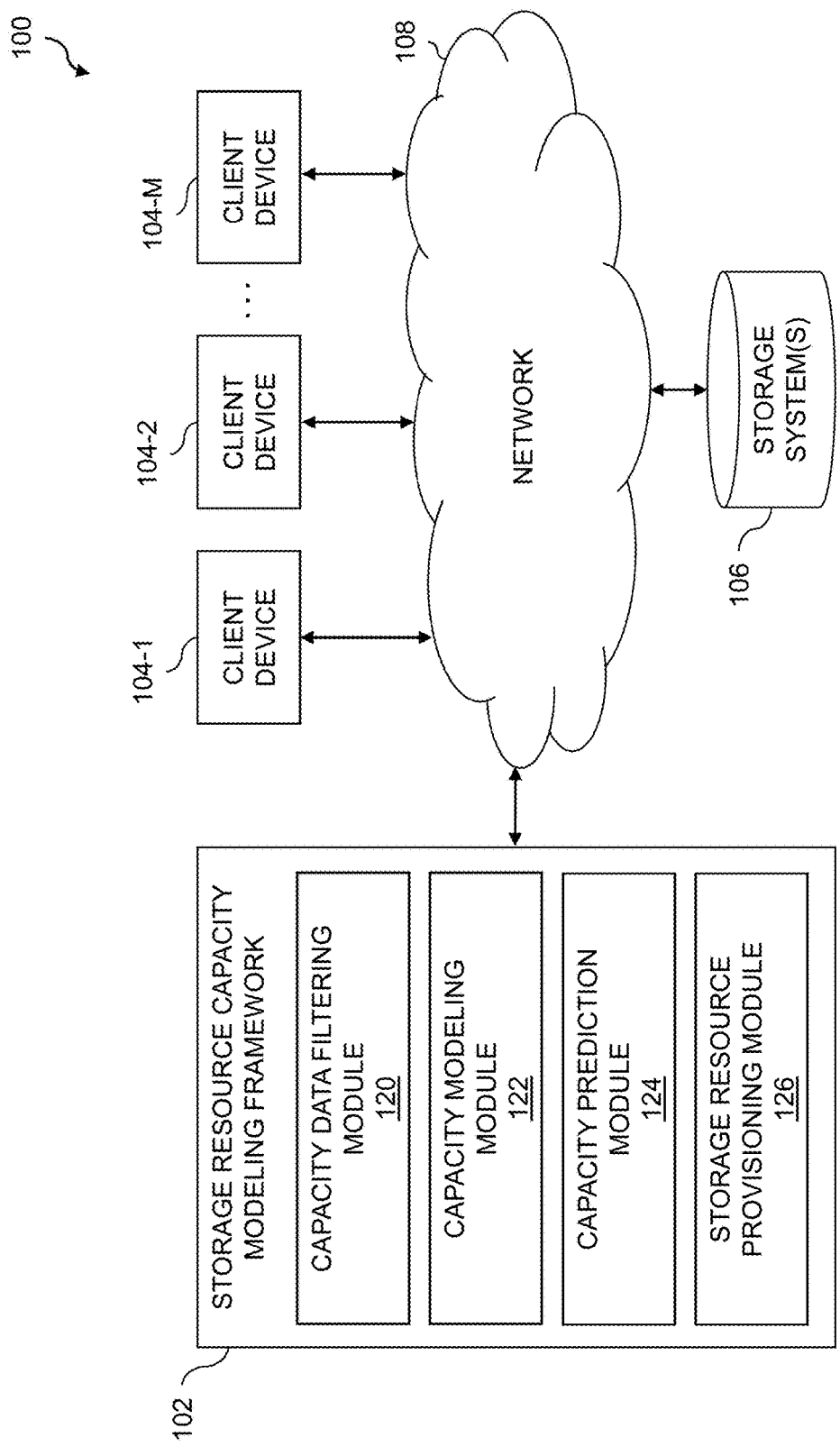
FIG. 1 is a block diagram of an information processing system for storage resource capacity prediction in an illustrative embodiment.

FIG. 1 shows an information processing system 100 configured in accordance with an illustrative embodiment. The information processing system 100 is assumed to be built on at least one processing platform and provides a storage resource capacity modeling framework 102 configured to generate storage resource capacity predictions, and to utilize such storage resource capacity predictions to modify the provisioning of storage resources of a set of storage systems 106. It should be appreciated that while various embodiments are described herein with respect to storage resource capacity prediction, embodiments are not limited solely to techniques for storage resource capacity prediction. More generally, the techniques described herein may be used for other types of predictions such as predicting inventory, manufacturing, etc., where seasonality of data may vary.

The storage systems 106 may comprise one or multiple different storage systems which collectively provide a set of storage resources that may be provisioned for use by users of a set of client devices 104-1, 104-2, . . . 104-M (collectively, client devices 104). Although shown as separate in FIG. 1, in some embodiments at least a portion of the storage systems 106 may be part of the storage resource capacity modeling framework 102.

The storage systems 106 provide storage resources or capacity that may be allocated or provisioned for use by users or data consumers via the client devices 104. The client devices 104 may comprise, for example, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as virtual machines (VMs), containers, etc.

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

In some embodiments, the storage systems 106 comprise a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement a storage system in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays such as Unity™ software-defined storage products such as ScaleIO™ and ViPR, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The storage resource capacity modeling framework 102, client devices 104 and storage systems 106 may be connected via at least one network 108. The network 108 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Although not explicitly shown in FIG. 1, one or more input-output devices such as keyboards, displays or other types of input-output devices may be used to support one or more user interfaces to the storage resource capacity modeling framework 102, as well as to support communication between the enterprise storage resource capacity modeling framework 102 and other related systems and devices not explicitly shown.

The storage resource capacity modeling framework 102 in the FIG. 1 embodiment implements a number of functional modules for generating storage resource capacity predictions and for utilizing such storage resource capacity predictions to modify the provisioning of storage resources of the storage system 106. Such functional modules include a capacity data filtering module 120, a capacity modeling module 122, a capacity prediction module 124, and a storage resource provisioning module 126.

The storage resource capacity modeling framework 102 is configured to obtain historical storage resource utilization data for a given set of storage resources of the storage systems 106. The historical storage resource utilization data may be obtained by monitoring the storage systems 106, from a database or data store associated with the storage systems 106, etc. The capacity data filtering module 120 is configured to apply pre-processing by passing the historical storage resource utilization data through one or more filters. The filters are configured to impute missing data in the historical storage resource utilization data, remove additive outliers in the historical storage resource utilization data, remove level change outliers in the historical storage resource utilization data, etc.

The capacity modeling module 122 is configured to generate a plurality of model-specific storage resource capacity predictions utilizing the historical storage resource utilization data and respective ones of a plurality of time series capacity prediction forecasting models. The plurality of time series capacity prediction forecasting models may include at least a first time series capacity prediction forecasting model that takes into account a first type of seasonality and trend factors and at least a second time series capacity prediction forecasting model that takes into account a second type of seasonality and trend factors. The first and second types may correspond to different "frequencies" of seasonality and trends. For example, the first type of seasonality and trend factors may correspond to weekly patterns, while the second type of seasonality and trend factors may correspond to daily patterns. It should be noted, however, that the "type" of seasonality and trend factors may result in the same model behaving differently (e.g., detecting different frequencies of seasonality and trends) under different conditions. It is difficult to determine the particular frequency of seasonality and trends that a model will consider under such different conditions.

The capacity prediction module 124 is configured to select a subset of the model-specific storage resource capacity predictions having one or more designated characteristics. The designated characteristics may be, for example, a particular range for a "cone of uncertainty" as described in further detail below, a threshold noise level, etc. The capacity prediction module 124 is also configured to determine an overall storage resource capacity prediction based at least in part on a combination of the selected subset of the model-specific storage resource capacity predictions.

The storage resource provisioning module 126 is configured to modify a provisioning of storage resources of the storage systems 106 based at least in part on the overall storage resource capacity prediction. Modifying storage resource provisioning may include adding storage resources to one or more of the storage systems 106 (e.g., increasing capacity by adding additional storage devices or capacity to the storage systems), adding or removing storage resources allocated to particular users of the storage systems 106, etc. Modifying storage resource provisioning may also include generating alerts and notifications as described in further detail below, which may include links to a user interface providing graphical output illustrating capacity forecasting for some designated time period.

It is to be appreciated that the particular arrangement of the storage resource capacity modeling framework 102, client devices 104 and storage systems 106 illustrated in the FIG. 1 embodiment is presented by way of example only, and alternative arrangements can be used in other embodiments. As an example, the functionality associated with the capacity data filtering module 120, the capacity modeling module 122, the capacity prediction module 124 and the storage resource provisioning module 126 may in some embodiments be combined into fewer modules, or may be separated across more modules, with the multiple modules possibly being implemented with multiple distinct processors or processing devices. As another example, one or more of the storage systems 106 may be implemented at least in part within the storage resource capacity modeling framework 102.

At least portions of the capacity data filtering module 120, the capacity modeling module 122, the capacity prediction module 124 and the storage resource provisioning module 126 may be implemented at least in part in the form of software that is stored in memory and executed by a processor.

In some embodiments, the storage resource capacity modeling framework 102 generates alerts and notifications that are provided over network 108 to client devices 104, or to a system administrator, information technology (IT) manager, or other authorized personnel via one or more host agents. Such host agents may be implemented via computing or processing devices associated with a system administrator, IT manager or other authorized personnel. Such devices can illustratively comprise mobile telephones, laptop computers, tablet computers, desktop computers, or other types of computers or processing devices configured for communication over network 108 with the storage resource capacity modeling framework 102. For example, a given host agent may comprise a mobile telephone equipped with a mobile application configured to receive alerts from the storage resource capacity modeling framework 102 and to provide an interface for the host agent to select particular remedial measures for responding to the alert or notification. Examples of such remedial measures may include altering the provisioning of storage resources for a particular user. This may include provisioning or allocating additional storage resources to a particular user (e.g., in response to a notification or alert indicating that the currently provisioned storage resource capacity for the user will be exceeded at some designated time, or that the amount of available or free storage resources allocated to the user will fall below some designated threshold, etc.). This may alternatively include removing storage resources from a set of provisioned storage resources of a particular user (e.g., in response to a notification or alert indicating under-utilization of the set of provisioned storage resources). In some cases, the remedial measure may include migrating data stored in a set of provisioned storage resources in response to an alert or notification (e.g., from a first set of storage systems to a second set of storage systems, where the first and second sets of storage systems may have different performance characteristics, capacity, etc.).

It should be noted that a "host agent" as this term is generally used herein may comprise an automated entity, such as a software entity running on a processing device. Accordingly, a host agent need not be a human entity.

It is to be understood that the particular set of elements shown in FIG. 1 for generating storage resource capacity predictions is presented by way of illustrative example only, and in other embodiments additional or alternative elements may be used. Thus, another embodiment may include additional or alternative systems, devices and other network entities, as well as different arrangements of modules and other components.

The storage resource capacity modeling framework 102 and other portions of the system 100, as will be described in further detail below, may be part of cloud infrastructure such as an Amazon Web Services (AWS) system. Other examples of cloud-based systems that can be used to provide the monitoring system 102 include Virtustream Enterprise Cloud, Virtustream Storage Cloud. Google Cloud Platform (GCP) and Microsoft Azure.

The storage resource capacity modeling framework 102 and other components of the information processing system 100 in the FIG. 1 embodiment are assumed to be implemented using at least one processing platform each comprising one or more processing devices each having a processor coupled to a memory. Such processing devices can illustratively include particular arrangements of compute, storage and network resources.

The storage resource capacity modeling framework 102 or components thereof (e.g., the capacity data filtering module 120, the capacity modeling module 122, the capacity prediction module 124 and the storage resource provisioning module 126) may be implemented on respective distinct processing platforms, although numerous other arrangements are possible.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the storage resource capacity modeling framework 102 and storage systems 106 or portions or components thereof, to reside in different data centers. Numerous other distributed implementations are possible. The storage resource capacity modeling framework 102 can also be implemented in a distributed manner across multiple data centers.

Additional examples of processing platforms utilized to implement the storage resource capacity modeling framework 102 in illustrative embodiments will be described in more detail below in conjunction with FIGS. 5 and 6.

It is to be appreciated that these and other features of illustrative embodiments are presented by way of example only, and should not be construed as limiting in any way.

An exemplary process for generating storage resource capacity predictions will now be described in more detail with reference to the flow diagram of FIG. 2. It is to be understood that this particular process is only an example, and that additional or alternative processes for generating storage resource capacity predictions can be carried out in other embodiments.

In this embodiment, the process includes steps 200 through 208. These steps are assumed to be performed by the storage resource capacity modeling framework 102 utilizing the capacity data filtering module 120, the capacity modeling module 122, the capacity prediction module 124 and the storage resource provisioning module 126. The process begins with step 200, obtaining historical storage resource utilization data for a given set of storage resources of one or more storage systems. The given set of storage resources in some embodiments comprises a storage pool allocated for a given user, the storage pool comprising a first set of storage resources allocated from a first one of the one or more storage systems and a second set of storage resources allocated from a second one of the one or more storage systems. In other embodiments, the given set of storage resources comprises a portion of a storage pool allocated for a given user, the portion of the storage pool comprising storage resources allocated from a single one of the one or more storage systems.

In step 202, a plurality of model-specific storage resource capacity predictions are generated utilizing the historical storage resource utilization data and respective ones of a plurality of time series capacity prediction forecasting models. The plurality of time series capacity prediction forecasting models comprises at least a first time series capacity prediction forecasting model that takes into account a first type of seasonality and trend factors, and at least a second time series capacity prediction forecasting model that takes into account a second type of seasonality and trend factors. As noted above, the first and second types of seasonality and trend factors may result in the first and second time series capacity prediction forecasting models considering different frequencies of seasonality and trends (e.g., daily vs. weekly). Generating the plurality of model-specific storage resource capacity predictions may comprise applying preprocessing by passing the historical storage resource utilization data through one or more filters. The one or more filters may include filters configured to impute missing data in the historical storage resource utilization data, filters configured to remove additive outliers in the historical storage resource utilization data, filters configured to remove level change outliers in the historical storage resource utilization data, etc.

Figure 2:
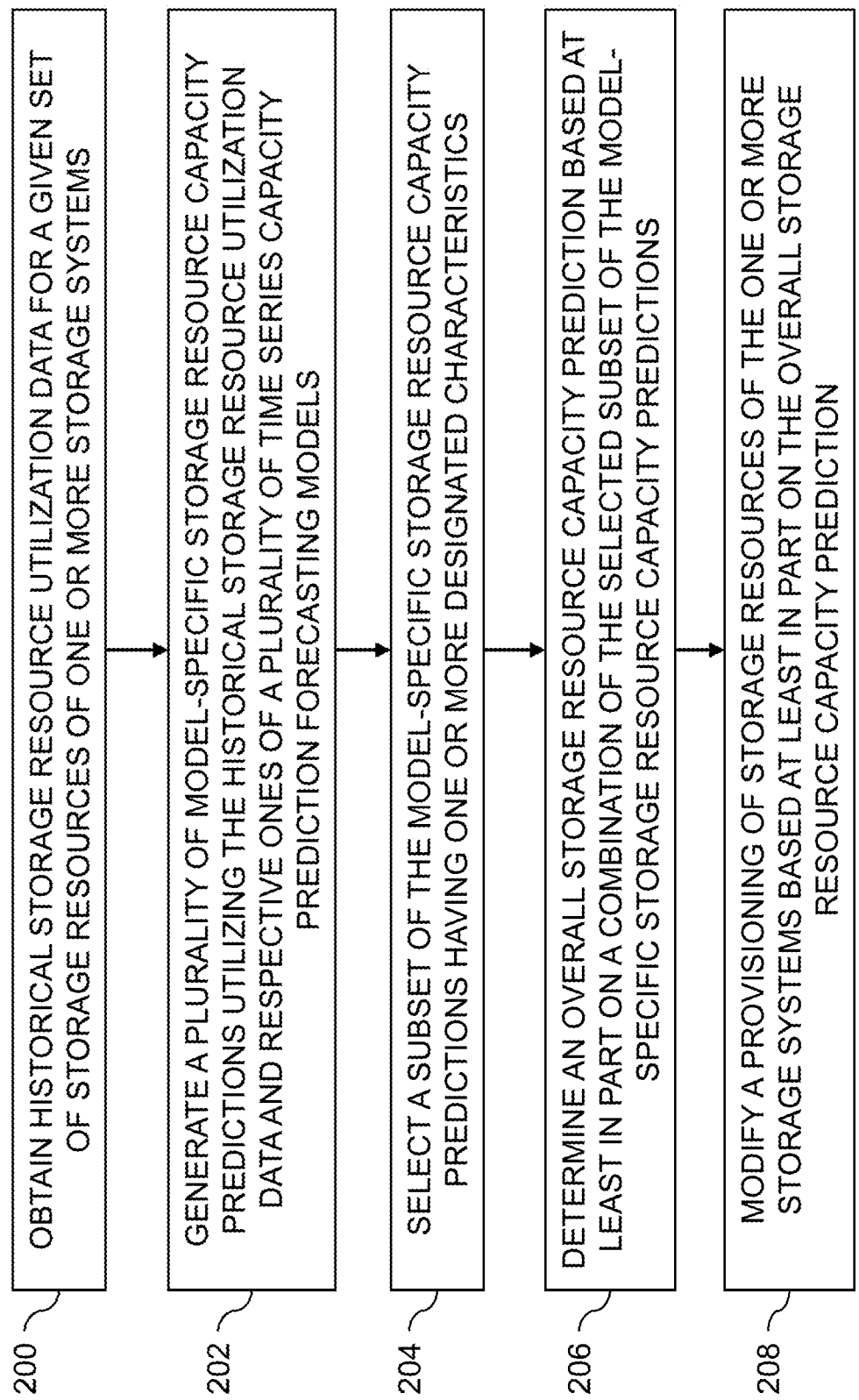
FIG. 2 is a flow diagram of an exemplary process for storage resource capacity prediction in an illustrative embodiment.

The FIG. 2 process continues with selecting a subset of the model-specific storage resource capacity predictions having one or more designated characteristics in step 204. In some embodiments, the model-specific storage resource capacity predictions comprise respective forecasts each with an associated cone of uncertainty defined by a forecast storage resource utilization value, an upper bound on the forecast utilization value, and a lower bound on the forecast storage resource utilization value. Selecting the subset of the model-specific storage resource capacity predictions having the one or more designated characteristics in step 204 may comprise selecting respective ones of the model-specific storage resource capacity predictions having associated cones of uncertainty with differences between the upper bound and the lower bound less than a designated threshold. Selecting the subset of the model-specific storage resource capacity predictions having the one or more designated characteristics in step 204 may further or alternatively comprise selecting respective ones of the model-specific storage resource capacity predictions having associated noise less than a designated threshold.

In step 206, an overall storage resource capacity prediction is determined based at least in part on a combination of the selected subset of the model-specific storage resource capacity predictions. Step 206 may include calculating the overall storage resource capacity prediction as a weighted average of the selected subset of the model-specific storage resource capacity predictions. Weights for the selected subset of the model-specific storage resource capacity predictions may be based at least in part on historical performance of respective ones of the time series capacity prediction forecasting models used to generate the selected subset of the model-specific storage resource capacity predictions.

The FIG. 2 process concludes with modifying a provisioning of storage resources of the one or more storage systems based at least in part on the overall storage resource capacity prediction in step 208. Step 208 may include determining a given one of a plurality of different time ranges when available storage resources of the one or more storage systems is expected to fall below a designated threshold based on the overall storage resource capacity prediction. Modifying the provisioning of the storage resources of the one or more storage systems may be based at least in part on the given time range when the available storage resources of the one or more storage systems is expected to fall below the designated threshold. When the given time range is within a designated time from a current time, modifying the provisioning may comprise increasing storage resources of the one or more storage systems. When the given time range is greater than the designated time from a current time, modifying the provisioning may comprise generating an alert indicating an expected time when the available storage resources of the one or more storage systems is expected to fall below the designated threshold.

In some information processing systems, such as data centers, cloud computing platforms, etc., different resources may be offered to tenants, customers or other users. As one example, storage resources of one or more storage systems may be allocated or provisioned for use by different users. The different users may have different storage usage patterns, and it is thus difficult to forecast the usage patterns for each user, or each storage system providing storage resources for different users, using a same algorithm. It is further difficult to select an accurate algorithm for each user or each storage system, when there are potentially hundreds or thousands of different users and storage systems to make forecasts or capacity predictions for. There is a need for automated forecasting or capacity prediction processes that can work for large numbers of different users and different storage systems, providing reasonable forecasts or capacity predictions based on historical usage patterns.

A capacity prediction algorithm may involve identifying historical storage resource utilization data. The historical storage resource utilization data may be used to forecast storage utilization using various models. The historical storage resource utilization data may be user-specific, or may be for a collection of multiple users. In some cases, the historical storage resource utilization data comprises sampled data, using statistical analysis techniques for taking a subset of data points to identify trends and patterns in a larger set of data points. Before forecasting, the data may be subject to various preprocessing. The historical storage resource utilization data may include real-time storage resource utilization data that is noisy, and the pre-processing may be performed to reduce or eliminate such noise. This may involve, for example, imputing missing values using interpolation, investigating and removing null values, checking for "stationarity" of data (e.g., ensuring that certain statistical properties such as mean, variance, etc. are constant over time), etc. Additional details regarding pre-processing of the historical storage resource utilization data will be described in further detail below.

Various types of models may be used to provide storage resource capacity forecasts or predictions. Such models include but are not limited to time series forecasting models such as a simple linear regression with seasonal effects models, exponential smoothing models, Autoregressive Integrated Moving Average (ARIMA)-based models, Seasonality Trend using Loess (STL) models, Bayesian Structural Time Series models, Trigonometric Seasonality, Box-Cox transformation, Autoregressive-moving-average (ARMA) errors, Trend and Seasonal components (TBATS) models, nonlinear regression models, Bayesian models, etc.

These different models can each perform well in some circumstances, and poorly in others.

Consider, by way of example, a STL model used to forecast future capacity utilization of storage systems based on different patterns or frequencies (e.g., daily, weekly, monthly, etc.). The STL model may be run using different frequencies to predict daily usage data, weekly usage data, monthly usage data, etc. In some cases, the STL model may be more accurate when forecasting at one frequency versus others (e.g., for a given set of historical storage resource utilization data, the STL model may provide more accurate daily forecasting than weekly or monthly forecasting). Different users, for example, may have different storage usage patterns and trends. Some users may have certain seasonality in their usage patterns (e.g., bi-weekly, monthly, etc.) which are better captured using such different frequencies.

The STL model is an example of an adaptive time series algorithm that may be run for such different frequencies to determine a most accurate frequency for a given set of historical storage resource utilization data. The accuracy of the STL model may be determined using a precision matrix, which may utilize Mean Absolute Percentage Error (MAPE), Mean Absolute Scaled Error (MASE), etc. The STL model, and other adaptive time series algorithm models, may provide as output a set of results with a "cone of uncertainty." The cone of uncertainty may be represented using an upper bound and a lower bound around a mean forecast. The cone of uncertainty defines a range of values such that the value of a particular parameter (e.g., predicted capacity usage) will remain within the cone of uncertainty. The upper and lower bounds represent the range of prediction values between which an actual value is expected to lie, with some designated confidence interval (e.g., an 80% confidence interval indicating that there is 80% confidence that the actual value will lie between the upper and lower bounds).

The above-described STL model used to forecast future capacity utilization of storage systems based on different frequency patterns (e.g., daily, weekly, monthly, etc.) may in some cases fail to capture the underlying behavior of historical storage resource utilization data, and may make flat predictions in some cases. Further, metrics such as MAPE and MASE used to identify a "good" model (e.g., where a good model has certain desired characteristics as described in further detail below) mostly decrease with corresponding increases in the frequency of the data when used with the same model. This makes it difficult to select a good model based on metrics such as MAPE and MASE. Further, the above-described STL model can also fail to capture underlying behavior or make good forecasts if the historical storage resource utilization data has certain features, such as sudden local spikes (e.g., additive outliers), level change outliers, etc. The above-described STL model will, however, perform well in other circumstances.

Other ones of the above-described time series forecasting models may also perform well in some cases and poorly in others. Thus, it is difficult to select any single model for storage resource capacity predictions that will perform well for a diverse set of users and storage systems. Illustrative embodiments provide improved capacity predictions by running historical storage resource utilization data through multiple models, where the multiple models illustratively include at least a first model that takes into account a first type of seasonality and trends when making forecasts, and at least a second model that takes into account a second type of seasonality and trends when making forecasts. The output of each of the multiple models is tested for certain designated failure or error conditions described in further detail below. Results from models that encounter such failure or error conditions are omitted from a result set used to provide an ensemble or overall storage resource capacity prediction.

As described above, historical storage resource utilization data may be subject to various pre-processing to prepare the data before being analyzed with multiple models. In some embodiments, the pre-processing includes passing the historical storage resource utilization data through one or more filters. The filters may remove leading zeros or not available (NA or N/A) values in the historical storage resource utilization data. A Kalman filter may be used to impute missing values in the historical storage resource utilization data. The historical storage resource utilization data may be run through a Hampel filter to remove any additive outliers present in the data. Various custom filters may also be used, such as a custom filter based on ARIMA residuals that removes level change outliers, to adjust the historical storage resource utilization data before forecasting using the multiple models.

Standardized metrics are not available for selecting a best model from among the multiple models used for forecasting. The order of metrics, such as MAPE and MASE, differs from model to model and are not necessarily consistent across different types of models. This complicates the task of selecting a "best" model or models from a set of multiple models. To provide accurate storage resource capacity predictions, embodiments utilize empirical conditions for evaluating the multiple models. Such empirical conditions include, but are not limited to, determining whether a model is completely or substantially (e.g., greater than some designated threshold) white noise, determining the spread of the upper and lower bounds on the cone of uncertainty, etc. These and other empirical conditions are used to determine or select appropriate models for generating an "ensemble" forecast or storage resource capacity prediction.

To determine whether the predictions from a particular model are white noise or not, various techniques may be used. In some embodiments, ARIMA-type techniques are used to look at the p, d and q coefficients (e.g., where the p coefficient represents the number of autoregressive terms, the d coefficient represents the number of non-seasonal differences needed for stationarity, and the q coefficient represents the lag of the error component representing a portion of the time series data not explained by trend or seasonality). If the p, d and q coefficients are 0, and other intermediate terms (e.g., such as the model coefficient) are also 0, then it may be concluded that the predictions for that model are pure white noise. Of course, different values or value ranges for the p, d and q coefficients may be used to determine if a model's predictions have noise above a designated threshold such that the model's predictions should be omitted from the ensemble forecast.

Figure 3:
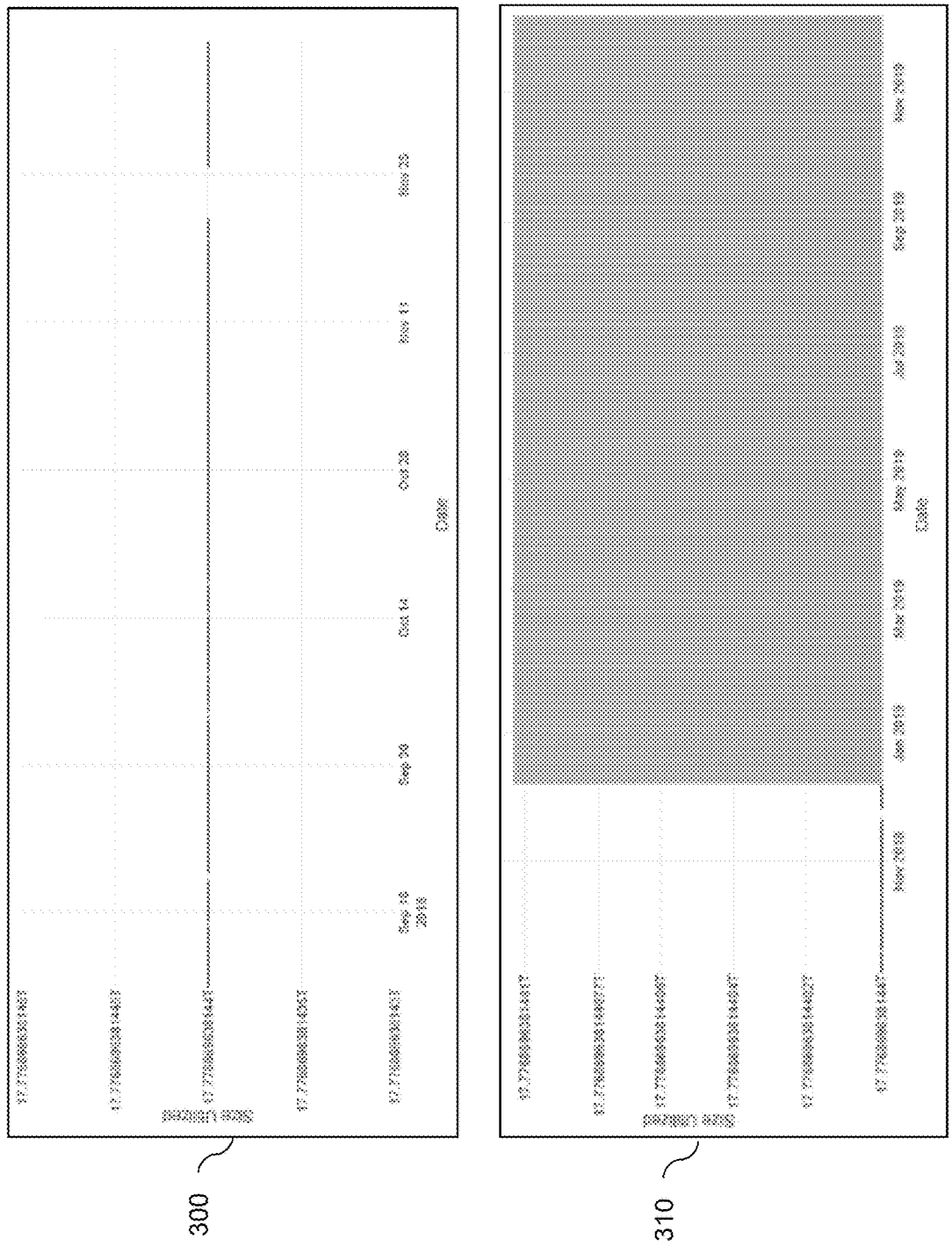
FIG. 3 shows an example of storage resource capacity prediction with white noise in an illustrative embodiment.

White noise may also be inferred by comparing the prediction provided by a model to the historical data for that model. If the historical time series data is "flat" (e.g., it approximates a simple flat line) but the upper and lower bounds of the predictions are very wide (e.g., above some designated threshold distance), the prediction provided by the model may be white noise. This is illustrated in FIG. 3, which shows two plots 300 and 310. Plots 300 and 310 show storage resource utilization in the vertical axis and time in the horizontal axis. Plot 300 shows historical data, which is a relatively flat line with little variation. Plot 310 shows a forecast, including the historical data and projections of future storage resource utilization. As illustrated, the forecast in plot 310 has significant variation in the bounds of prediction, relative to the variation in the historical data shown in plot 300 and in the beginning of the plot 310.

For the cone of uncertainty, some embodiments use a threshold of ten times the capacity size as the size threshold between the upper and lower bounds. For example, if a storage pool has a current capacity of 20 terabytes (TB), and the final prediction indicates that storage resource utilizing in the storage pool will be 500 TB in one year this is outside the 10× threshold (e.g., 20 TB*10=200 TB). As 500 TB crosses the 10× threshold mark (e.g., 200 TB in this example), the predictions from the model may be ignored or removed and not included in the ensemble forecast. It should be appreciated that the particular threshold of 10 times the capacity size is presented by way of example only, and that various other thresholds may be used for determining whether the cone of uncertainty of a model's predictions should be ignored and removed from the ensemble forecast.

The ensemble forecast uses the selected models to generate a set of individual or model-specific storage resource capacity predictions (e.g., one from each of the selected models). The model-specific storage resource capacity predictions are combined (e.g., using a weighted average) to calculate the overall or ensemble storage resource capacity prediction. If the ensemble storage resource capacity prediction has a very wide cone of uncertainty (e.g., upper and lower bounds that differ by more than a designated threshold), the system may fall back to a default or standard model (e.g., such as the above-described STL model, a linear regression model with seasonal effects, etc.) to provide the final output storage resource capacity prediction. The weights assigned to each of the model-specific storage resource capacity predictions may be selected based on evaluating results across multiple users and/or storage systems, and iteratively refining the results.

The ensemble storage resource capacity prediction may be for a particular user, for a particular storage system, or combinations thereof. For example, the ensemble storage resource capacity prediction may be for a storage pool that is thin provisioned for a particular user, where the storage pool includes storage resources of one storage system or multiple different storage systems. The ensemble storage resource capacity prediction may alternatively be for a particular storage system. This may be useful for the operator of IT infrastructure (e.g., a cloud service provider) to determine when storage resources of a particular storage system will run out and thus when capacity needs to be upgraded. The ensemble storage resource capacity prediction may alternatively be for both a particular user and a particular storage system. A given user, for example, may have an associated storage pool with storage resources across different storage systems having different characteristics (e.g., input/output (IO) throughput, latency, redundancy, etc.). The given user may desire a capacity prediction for the storage resources in a storage pool having a particular set of such characteristics, including for a particular storage system from which storage resources in the storage pool are provisioned. It is to be appreciated that the above scenarios are presented by way of example only, and that ensemble storage resource capacity predictions may be provided for various other scenarios.

An ensemble storage resource capacity prediction may include various information. In some embodiments, an ensemble storage resource capacity prediction includes an expected time where capacity is expected to run out. The expected time, in some cases, is a specific date and time (or date and time range) at which capacity is expected to run out. The expected time, in other cases, is one of a plurality of different time "buckets" (e.g., in one day, in one week, in one month, etc.). Alerts and notifications, or other remedial measures such as automatically adjusting the provisioning of storage resources, may be based on which "bucket" the prediction falls into. The different buckets may be associated with different priorities, resulting in different actions taken. If the ensemble storage resource capacity prediction falls into a first bucket, the action taken may be to automatically adjust the provisioning of storage resources. This may be useful in cases where the impact is higher or critical (e.g., where capacity is expected to run out imminently). If the ensemble storage resource capacity prediction falls into a second bucket, the action taken may be to generate an alert or notification to an appropriate user (e.g., where capacity is expected to run out some time in the future). The buckets and associated actions taken may be user-defined, or customized based on the user. For example, some users may wish to be more proactive about upgrading storage resources to avoid possibly running out of capacity (e.g., such as when storage resources are used for critical applications).

The ensemble storage resource capacity prediction may also or alternatively include a forecast of storage resource capacity utilization over a designated time period. The designated time period may be from a current time until the time at which capacity is expected to run out. The forecast may be a waveform or graphical output, showing forecast storage resource utilization plotted with an associated cone of uncertainty (e.g., upper and lower bounds along with a mean or median). The graphical output, in some cases, includes some historical data as well as the forecast data.

Figure 4:
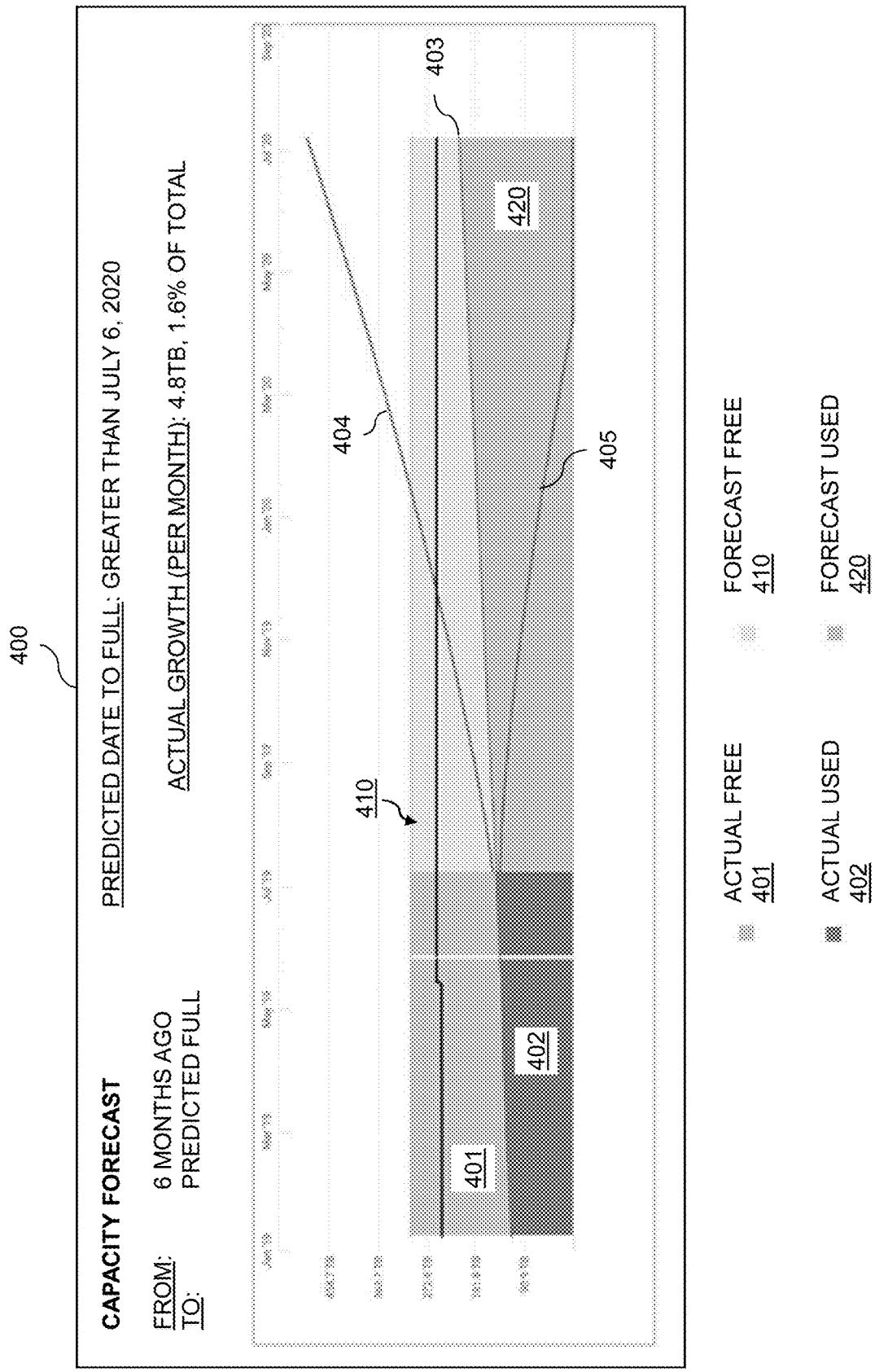
FIG. 4 shows an example storage resource capacity prediction for a user in an illustrative embodiment.
Figure 5:
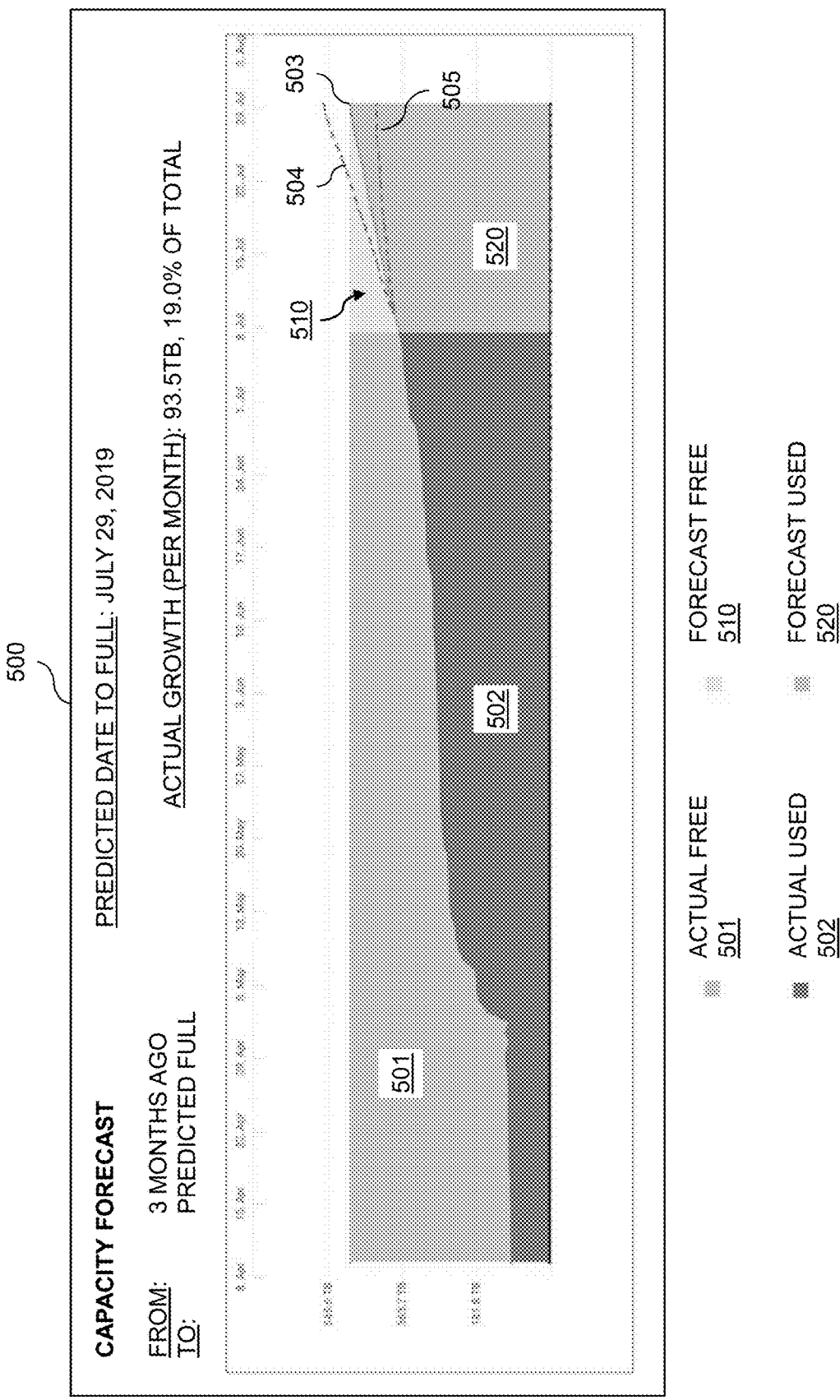
FIG. 5 shows another example storage resource capacity prediction for a user in an illustrative embodiment.

FIGS. 4 and 5 shows examples of storage resource capacity prediction graphical outputs 400 and 500, respectively. The graphical output 400 of FIG. 4 shows an example where the storage pool for a given user will not run out of capacity for at least a year assuming the given user has the same storage resource utilization rate. The graphical output 500 of FIG. 5 shows an example where the storage pool for a given user is expected to run out of capacity within the next quarter assuming the given user has the same storage resource utilization rate. In each of FIGS. 4 and 5, the output includes a waveform showing historical storage resource utilization (e.g., actual amounts of free or available storage resources 401/501, actual amounts of storage resources used 402/502) and forecast storage resource utilization (e.g., forecast amounts of free or available storage resources 410/510, forecast amounts of storage resources used 420/520). The output also illustrates the cone of uncertainty, with lines showing a mean value (e.g., 403/503), an upper bound (e.g., 404/504) and a lower bound (e.g., 405/505) on the forecasts. The particular graphical form of the output (e.g., as line graphs) shown in FIGS. 4 and 5 is presented by way of example only. In other embodiments, the ensemble storage resource capacity predictions may use bar graphs, pie charts, etc. An interface may also be provided to allow for selecting different display intervals, amounts of historical data, etc.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for storage resource capacity prediction will now be described in greater detail with reference to FIGS. 6 and 7. Although described in the context of system 100, these platforms may also be used to implement at least portions of other information processing systems in other embodiments.

Figure 6:
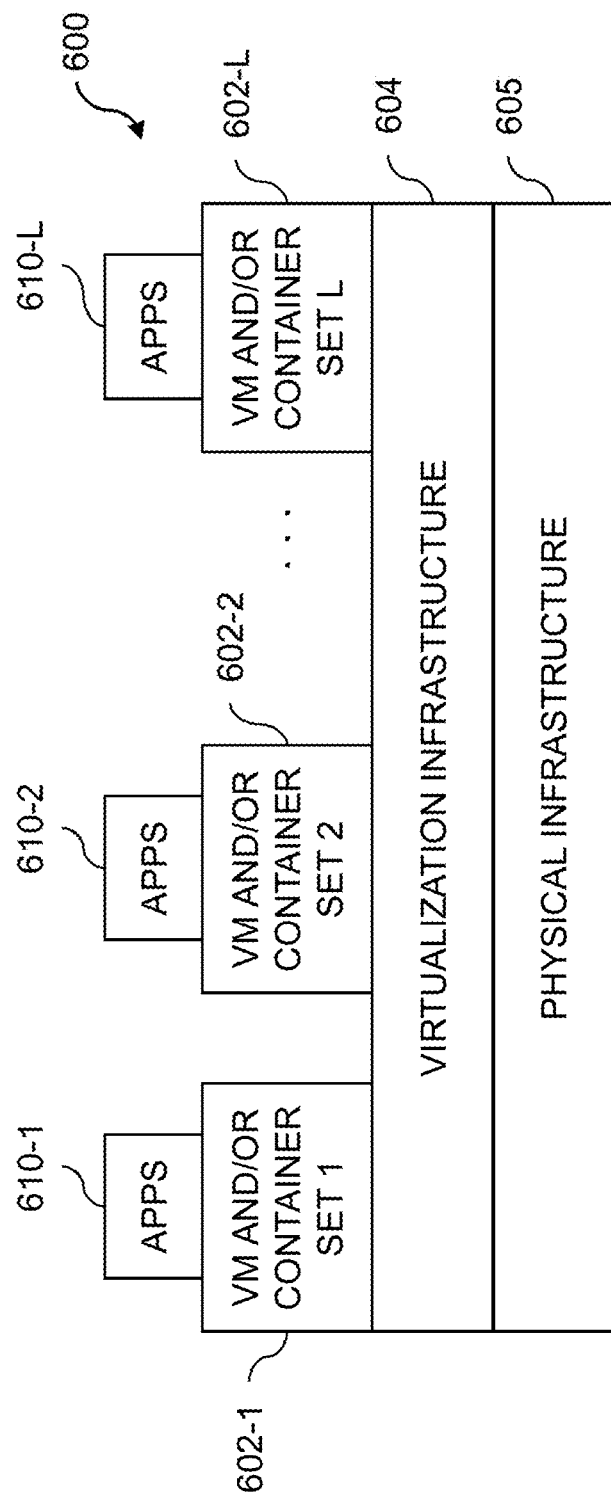
FIGS. 6 and 7 show examples of processing platforms that may be utilized to implement at least a portion of an information processing system in illustrative embodiments.
Figure 7:
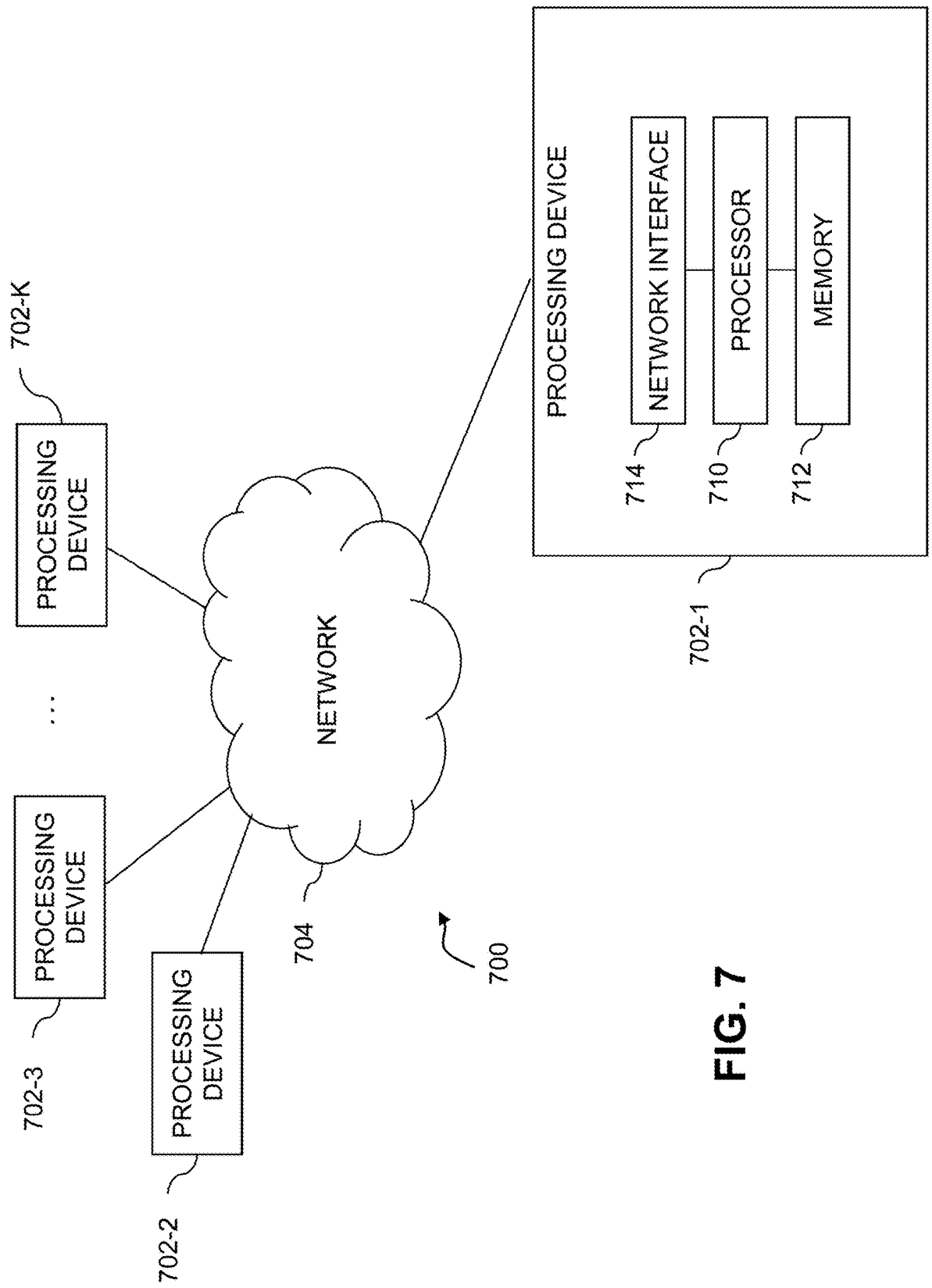

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 504. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise RAM, read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for storage resource capacity prediction as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, time series forecasting models, filters, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
monitoring one or more storage systems to obtain historical storage resource utilization data characterizing resource utilization for a given set of storage resources of the one or more storage systems for a first period of time;
generating a plurality of different model-specific storage resource capacity predictions of resource utilization for the given set of storage resources for a second period of time subsequent to the first period of time, the plurality of different model-specific storage resource capacity predictions being generated by applying the historical storage resource utilization data as input to respective ones of a plurality of different time series capacity prediction forecasting models that take into account one or more different factors, including at least one of a seasonality factor and a trend factor;
evaluating the plurality of different model-specific storage resource capacity predictions utilizing one or more empirical conditions, the one or more empirical conditions comprising at least one of noise and uncertainty;
selecting a subset of the plurality of model-specific storage resource capacity predictions having one or more designated characteristics, the one or more designated characteristics comprising at least one of a level of noise below a designated noise threshold and a level of uncertainty below a designated uncertainty threshold;
determining an overall storage resource capacity prediction based at least in part on a combination of the selected subset of the model-specific storage resource capacity predictions; and
modifying a provisioning of storage resources of the one or more storage systems based at least in part on the overall storage resource capacity prediction;
wherein the method is performed by at least one processing device comprising a processor coupled to a memory.

2. The method of claim 1 wherein the given set of storage resources comprises a storage pool allocated for a given user, the storage pool comprising a first set of storage resources allocated from a first one of the one or more storage systems and a second set of storage resources allocated from a second one of the one or more storage systems.

3. The method of claim 1 wherein the given set of storage resources comprises a portion of a storage pool allocated for a given user, the portion of the storage pool comprising storage resources allocated from a single one of the one or more storage systems.

4. The method of claim 1 wherein the plurality of time series capacity prediction forecasting models comprises:
at least a first time series capacity prediction forecasting model that takes into account a first type of seasonality and trend factors; and
at least a second time series capacity prediction forecasting model that takes into account a second type of seasonality and trend factors.

5. The method of claim 1 wherein the first time series capacity prediction forecasting model comprises at least one of a Seasonality Trend using Loess (STL) model and an Autoregressive Integrated Moving Average (ARIMA)-based model.

6. The method of claim 1 wherein generating the plurality of model-specific storage resource capacity predictions further comprises applying pre-processing by passing the historical storage resource utilization data through one or more filters.

7. The method of claim 6 wherein the one or more filters comprises at least one of:
a first filter configured to impute missing data in the historical storage resource utilization data;
a second filter configured to remove additive outliers in the historical storage resource utilization data; and
a third filter configured to remove level change outliers in the historical storage resource utilization data.

8. The method of claim 1 wherein the model-specific storage resource capacity predictions comprise respective forecasts each with an associated cone of uncertainty defined by a forecast storage resource utilization value, an upper bound on the forecast utilization value, and a lower bound on the forecast storage resource utilization value.

9. The method of claim 8 wherein selecting the subset of the model-specific storage resource capacity predictions having the one or more designated characteristics comprises selecting respective ones of the model-specific storage resource capacity predictions having associated cones of uncertainty with differences between the upper bound and the lower bound less than the designated uncertainty threshold.

10. The method of claim 1 wherein selecting the subset of the model-specific storage resource capacity predictions having the one or more designated characteristics comprises selecting respective ones of the model-specific storage resource capacity predictions having associated noise less than the designated noise threshold.

11. The method of claim 1 wherein determining the overall storage resource capacity prediction comprises calculating the overall storage resource capacity prediction as a weighted average of the selected subset of the model-specific storage resource capacity predictions, wherein weights for the selected subset of the model-specific storage resource capacity predictions are based at least in part on historical performance of respective ones of the time series capacity prediction forecasting models used to generate the selected subset of the model-specific storage resource capacity predictions.

12. The method of claim 1 further comprising determining a given one of a plurality of different time ranges when available storage resources of the one or more storage systems is expected to fall below a designated capacity threshold based on the overall storage resource capacity prediction, and wherein modifying the provisioning of the storage resources of the one or more storage systems is based at least in part on the given time range when the available storage resources of the one or more storage systems is expected to fall below the designated capacity threshold.

13. The method of claim 12 wherein when the given time range is within a designated time from a current time, modifying the provisioning of the storage resources of the one or more storage systems comprises increasing storage resources of the one or more storage systems.

14. The method of claim 12 wherein when the given time range is greater than a designated time from a current time, modifying the provisioning of the storage resources of the one or more storage systems comprises generating an alert indicating an expected time when the available storage resources of the one or more storage systems is expected to fall below the designated capacity threshold.

15. A computer program product comprising a non-transitory processor-readable storage medium having stored therein program code of one or more software programs, wherein the program code when executed by at least one processing device causes the at least one processing device:
to monitor one or more storage systems to obtain historical storage resource utilization data characterizing resource utilization for a given set of storage resources of the one or more storage systems for a first period of time;
to generate a plurality of different model-specific storage resource capacity predictions of resource utilization for the given set of storage resources for a second period of time subsequent to the first period of time, the plurality of different model-specific storage resource capacity predictions being generated by applying the historical storage resource utilization data as input to respective ones of a plurality of different time series capacity prediction forecasting models that take into account one or more different factors, including at least one of a seasonality factor and a trend factor;
to evaluate the plurality of different model-specific storage resource capacity predictions utilizing one or more empirical conditions, the one or more empirical conditions comprising at least one of noise and uncertainty;
to select a subset of the plurality of model-specific storage resource capacity predictions having one or more designated characteristics, the one or more designated characteristics comprising at least one of a level of noise below a designated noise threshold and a level of uncertainty below a designated uncertainty threshold;
to determine an overall storage resource capacity prediction based at least in part on a combination of the selected subset of the model-specific storage resource capacity predictions; and
to modify a provisioning of storage resources of the one or more storage systems based at least in part on the overall storage resource capacity prediction.

16. The computer program product of claim 15 wherein:
the model-specific storage resource capacity predictions comprise respective forecasts each with an associated cone of uncertainty defined by a forecast storage resource utilization value, an upper bound on the forecast utilization value, and a lower bound on the forecast storage resource utilization value; and
selecting the subset of the model-specific storage resource capacity predictions having the one or more designated characteristics comprises selecting respective ones of the model-specific storage resource capacity predictions having associated cones of uncertainty with differences between the upper bound and the lower bound less than the designated uncertainty threshold.

17. The computer program product of claim 15 wherein selecting the subset of the model-specific storage resource capacity predictions having the one or more designated characteristics comprises selecting respective ones of the model-specific storage resource capacity predictions having associated noise less than the designated noise threshold.

18. An apparatus comprising:
at least one processing device comprising a processor coupled to a memory;
the at least one processing device being configured:
to monitor one or more storage systems to obtain historical storage resource utilization data characterizing resource utilization for a given set of storage resources of the one or more storage systems for a first period of time;
to generate a plurality of different model-specific storage resource capacity predictions of resource utilization for the given set of storage resources for a second period of time subsequent to the first period of time, the plurality of different model-specific storage resource capacity predictions being generated by applying the historical storage resource utilization data as input to respective ones of a plurality of different time series capacity prediction forecasting models that take into account one or more different factors, including at least one of a seasonality factor and a trend factor;
to evaluate the plurality of different model-specific storage resource capacity predictions utilizing one or more empirical conditions, the one or more empirical conditions comprising at least one of noise and uncertainty;
to select a subset of the plurality of model-specific storage resource capacity predictions having one or more designated characteristics, the one or more designated characteristics comprising at least one of a level of noise below a designated noise threshold and a level of uncertainty below a designated uncertainty threshold;
to determine an overall storage resource capacity prediction based at least in part on a combination of the selected subset of the model-specific storage resource capacity predictions; and
to modify a provisioning of storage resources of the one or more storage systems based at least in part on the overall storage resource capacity prediction.

19. The apparatus of claim 18 wherein:
the model-specific storage resource capacity predictions comprise respective forecasts each with an associated cone of uncertainty defined by a forecast storage resource utilization value, an upper bound on the forecast utilization value, and a lower bound on the forecast storage resource utilization value; and
selecting the subset of the model-specific storage resource capacity predictions having the one or more designated characteristics comprises selecting respective ones of the model-specific storage resource capacity predictions having associated cones of uncertainty with differences between the upper bound and the lower bound less than the designated uncertainty threshold.

20. The apparatus of claim 18 wherein selecting the subset of the model-specific storage resource capacity predictions having the one or more designated characteristics comprises selecting respective ones of the model-specific storage resource capacity predictions having associated noise less than the designated noise threshold.

* * * * *